United States Patent [19]
Mizushima et al.

[11] Patent Number: 5,617,263
[45] Date of Patent: Apr. 1, 1997

[54] METHOD OF AND APPARATUS FOR RECORDING DATA SUITABLE FOR A DIGITAL RECORDING IN A MULTIPLEXED FASHION

[75] Inventors: Tetsuya Mizushima, Yawata; Tatsuro Juri, Osaka; Chiyoko Matsumi; Kazuo Kawakami, both of Suita, all of Japan

[73] Assignee: Matsushita Electric Industrial Co., Ltd., Kadoma, Japan

[21] Appl. No.: 548,602

[22] Filed: Oct. 26, 1995

Related U.S. Application Data

[63] Continuation of Ser. No. 239,046, May 6, 1994, abandoned.

[30] Foreign Application Priority Data

May 10, 1993 [JP] Japan .................................. 5-108033
Mar. 17, 1994 [JP] Japan .................................. 6-046229

[51] Int. Cl.⁶ .............................. G11B 5/09; H04N 5/76
[52] U.S. Cl. .................................. 360/48; 386/60; 386/124
[58] Field of Search ........................... 360/13, 14.1, 18, 360/32, 48; 358/335

[56] References Cited

U.S. PATENT DOCUMENTS

| | | | |
|---|---|---|---|
| 4,882,732 | 11/1989 | Kaminaga | 360/53 |
| 4,914,527 | 4/1990 | Asai et al. | 360/19.1 |
| 5,327,295 | 7/1994 | Togashi et al. | 360/13 |
| 5,396,374 | 3/1995 | Kubota et al. | 360/19.1 |

FOREIGN PATENT DOCUMENTS

| | | |
|---|---|---|
| 241014 | 10/1987 | European Pat. Off. . |
| 60-7644 | 1/1985 | Japan . |
| 2168512 | 6/1986 | United Kingdom . |

OTHER PUBLICATIONS

E. Engberg, et al., "The Composite Digital Format and Its Applications", *SMPTE Journal*, 95, 3, pp. 934–942 (Oct. 1987).

"19–mm type D–1 Cassette–Tape Record", *SMPTE Journal*, 96, 10, (Mar. 1986).

*Primary Examiner*—W. C Kim
*Attorney, Agent, or Firm*—Ratner & Prestia

[57] ABSTRACT

An information data composed of a predetermined quantity converted from input data and an information data parity for use in detecting or correcting an error in the information data are formulated. An ID comprising information including position information indicative of a position of the information data relative to a recording medium, and an ID parity for use in detecting or correcting an error in the ID are formulated. Then, a sync pattern is formulated, followed by formulation of a sync block comprised of the sync pattern, the ID, the ID parity, the information data and the information data parity. A plurality of the sync blocks are connected together to provide a recording area. This recording area forms a track together with other recording areas. Three or more consecutive tracks forms a minimum editing unit with which recording or reproduction is carried out. Each minimum editing unit has a plurality of the sync blocks having the same information data, and the plural tracks forming each minimum editing unit includes at least one track other than those positioned on respective opposite sides of the minimum editing unit.

8 Claims, 13 Drawing Sheets

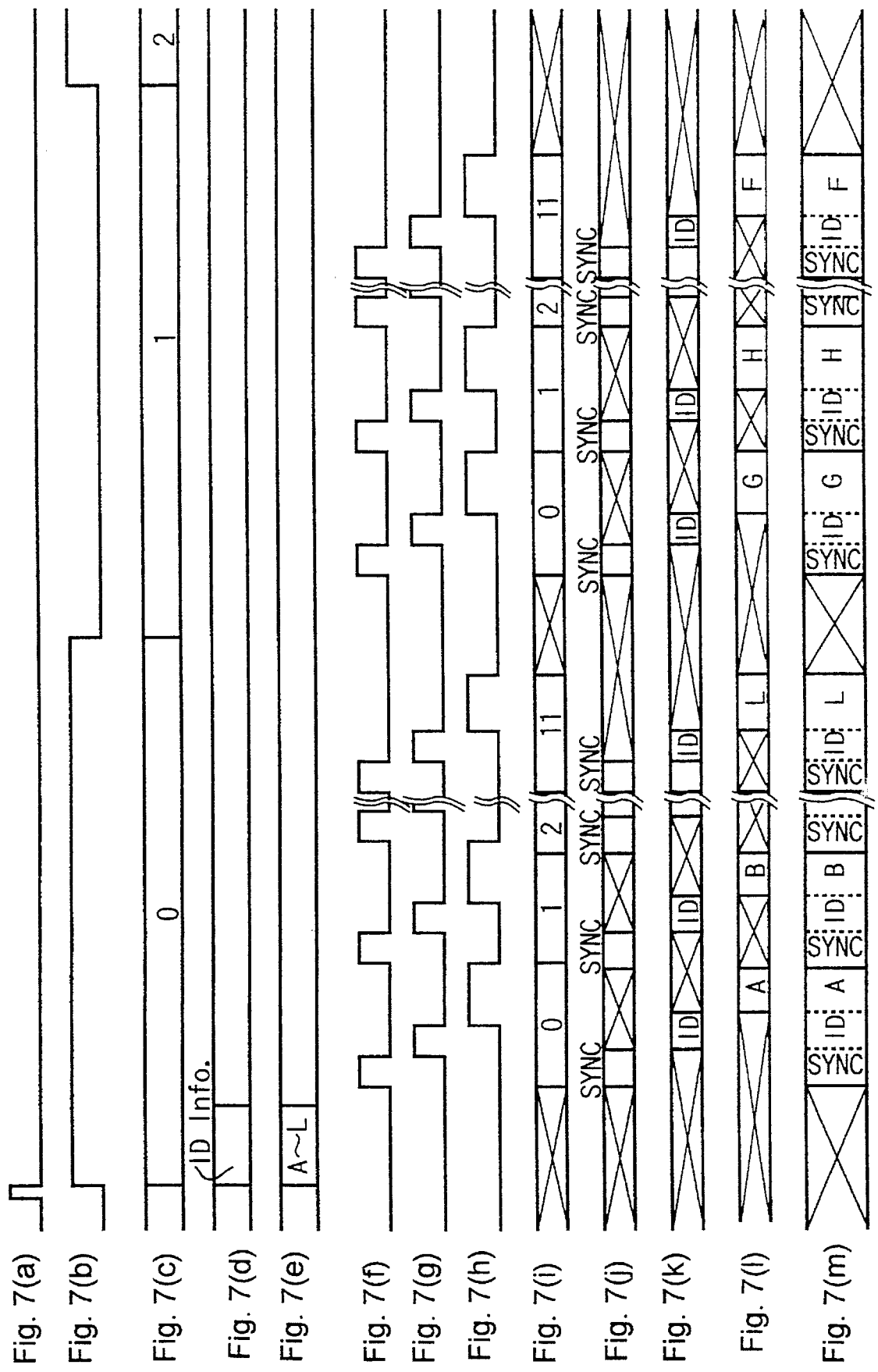

5,617,263

METHOD OF AND APPARATUS FOR RECORDING DATA SUITABLE FOR A DIGITAL RECORDING IN A MULTIPLEXED FASHION

This application is a continuation of application Ser. No. 08/239,046 filed May 6, 1994, abandoned.

BACKGROUND OF THE INVENTION

1. Field of the Invention

The present invention relates to a digital data recording method and apparatus for recording and/or reproducing digital data and a digital data reproducing apparatus.

2. Description of the Prior Art

A digital recording/reproducing technology has recently been utilized in various field of industry, particularly in a digital audio-video application, and digital video devices of D1 or D2 type have come to be utilized in rotary head systems for business use.

In view of an advance made in high-density recording technology and image compression technology such as MPEG, it has been longed for development of a compact, high performance inexpensive digital video device for home use.

Information data (hereinafter referred to as time codes) representative of position information such as information for use in search of contents recorded on a length of magnetic tape and/or time information in the digital video device of either D1 type or D2 type are standardized as LTC (Linear Time Code) which is recorded by a fixed head and VITC (Vertical Interval Time Code) which is recorded in superimposed fashion with image data.

Since LTCs are recorded by the fixed head in parallel relation to the direction of travel of the length of magnetic recording tape, they can be properly reproduced even during a high speed reproduction. On the other hand, reproduction of VITCs at a high speed is correlated with the length of sync blocks which is a unit of recording of data and can therefore be reproduced at a speed some tens times the normal speed.

The digital video device is discussed in detail in "19-mm type D-1 Cassette-Tape Record" (March, 1986, SMPTE J., 95, 3) and "The Composite Digital Format and its Application" (October, 1987, SMPTE J., 96,10).

However, the LTC of the existing structure requires the use of, in addition to the rotary head for recording audio and video signals which are a main signal, a fixed head dedicated for LTC, resulting in an increase of costs. This also has a problem in that the number of recording areas in the length of magnetic recording tape tends to increase since a linear track is necessitated in the length of magnetic recording tape for accommodating time codes.

With respect to VITC, since the VITCs are recorded superimposed with the image data, they cannot be reproduced at a high speed and, in addition, only the VITC time codes cannot be recorded again.

These problems are extremely detrimental to the existence of the data recording apparatus.

SUMMARY OF THE INVENTION

The present invention is to simplify the apparatus by recording areas for input data including the data search information and the time information, on the same track as that of other recording area, and also to increase the performance of demodulation of sub-code data.

According to the present invention, a digital data recording apparatus herein disclosed is such that the sync block positioning step forms a plurality of minimum editing units with which recording or reproduction is carried out on or from the track are formed. Each of the minimum editing unit includes a predetermined number of consecutive tracks not smaller than three tracks, while each of the consecutive tracks of said minimum editing unit includes a plurality of sync blocks formed therein and having the same information data. In each minimum editing unit the sync blocks having the same information data are distributed to plural tracks including at least one of the consecutive tracks other than the two tracks occupying opposite sides of the respective minimum editing unit with respect to a direction of movement of the recording medium.

Alternatively or in combination therewith, the sync blocks having the same information data may be distributed so as to occupy respective different positions on the consecutive tracks with respect to a lengthwise direction of each track.

In the recording and/or reproducing apparatus in which the head of a width larger than the track pitch is employed, all of the information data can be properly demodulated even though the track in the vicinity of the editing point at which the once-recorded pattern is over-recorded fails to be reproduced.

Also, by moving the length of tape at a speed different from the normal speed, even during the high speed reproduction in which the head fails to trace the track according to the pattern, the performance with which the information data are demodulated can be improved.

Yet, since input data are recorded by providing a dedicated signal area within the track having the video and audio signal areas by means of a track formulating step, reproduction or recording of only the above described signal areas can be accomplished.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIGS. 7(a)–7(m) are timing charts showing the operation of the circuit in the embodiment of the present invention;

DETAILED DESCRIPTION OF THE EMBODIMENTS

In a digital signal recording/reproducing apparatus for recording or reproducing a digital signal, recording tracks are formed on a length of magnetic recording tape by two magnetic heads, mounted on a rotatable cylinder so as to extend diagonally relative to the lengthwise direction of the magnetic recording tape. A signal to be recorded on each track includes a sub-code area in which search information used to search contents recorded on the tape and time information are recorded, an audio area in which an audio signal is recorded, and a video area in which a video signal is recorded.

In the illustrated embodiment, the sub-code area which is one of signal areas forming each track is used to record therein the search information and the time information and, therefore, reference is made thereto in describing it.

Figure 1:
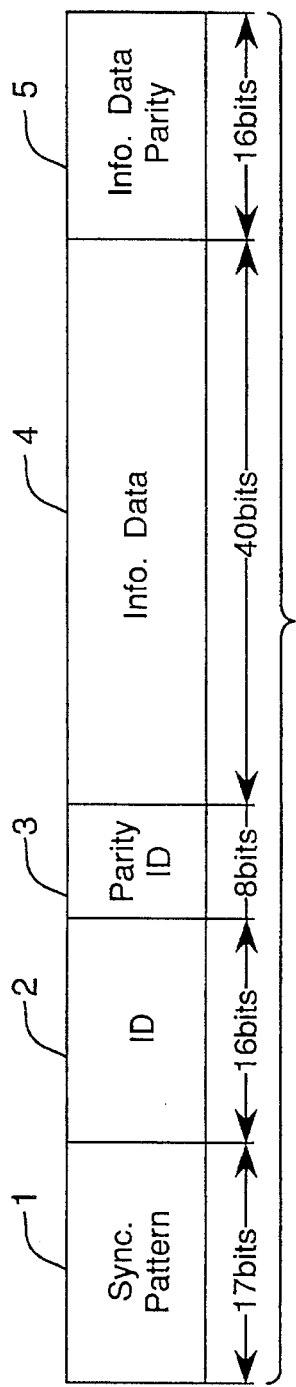
FIG. 1 is an explanatory diagram showing a structure of a sync block employed in an embodiment of the present invention.

The sub-code area is composed of a plurality of sync blocks each having such a structure as shown in FIG. 1. Reference numeral 1 represents a sync pattern of a 17-bit length indicative of the start of the blocks of the sub-code area; reference numeral 2 represents an ID of a 16-bit length indicative of information of the absolute position of the tape and the sequence of the blocks within each track; reference numeral 3 represents an ID parity of a 8-bit length used to detect an ID error; reference numeral 4 represents a information data of a 40-bit length; reference numeral 5 represents an information data parity of a 16-bit length used to detect or correct an error in the information data; and reference numeral 6 represents a sync block.

Figure 2:
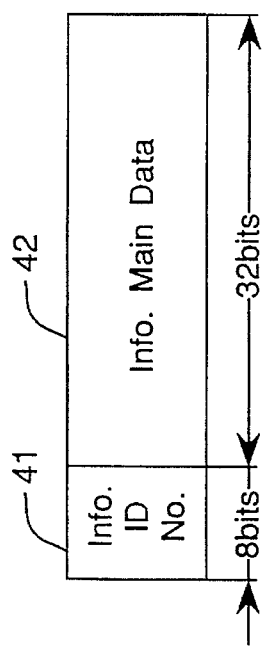
FIG. 2 is an explanatory diagram showing a structure of an information data employed in the embodiment of the present invention.

The information data is of a structure shown in FIG. 2. In FIG. 2, reference numeral 41 represents an information identification number of a 8-bit length indicative of contents of the information data, and reference numeral 42 represents an information main data of a 32-bit length. The information data 4 is composed of the information identification number 41 and the information main data 42.

Figure 3:
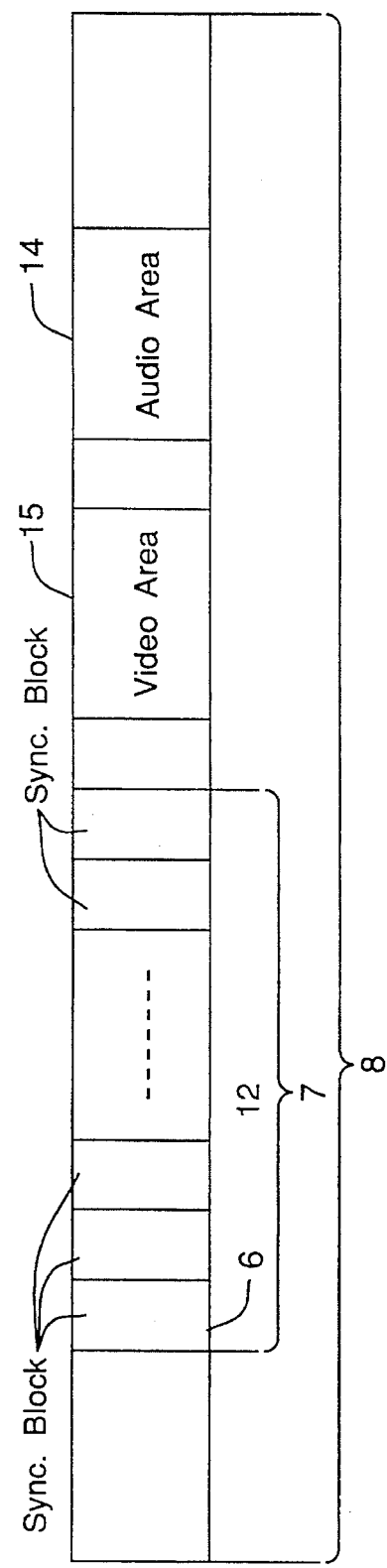
FIG. 3 is an explanatory diagram showing a track pattern in the embodiment of the present invention.

The structure of each track is shown in FIG. 3. In this figure, reference numeral 7 represents a sub-code area; reference numeral 8 represents the track; reference numeral 14 represents an audio area; and reference numeral 15 represents a video area. The track 8 contains therein the sub-code area 7, and this sub-code area 7 is composed of twelve sync blocks 6.

Figure 4:
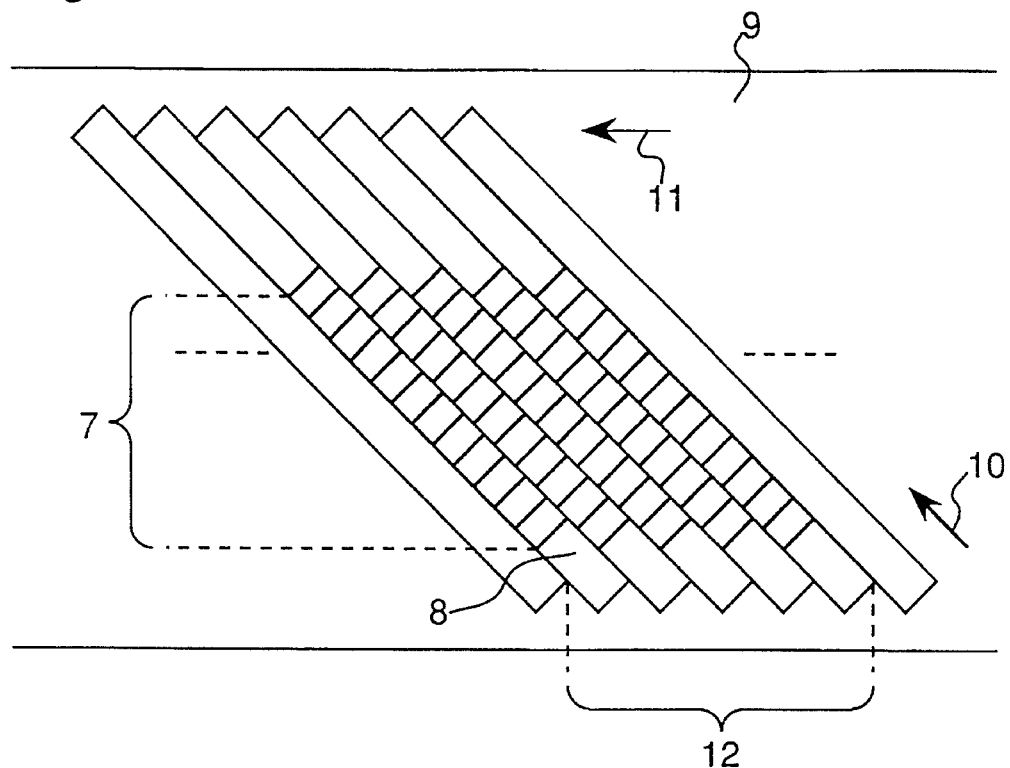
FIG. 4 is an explanatory diagram showing a tape pattern in the embodiment of the present invention.

The pattern of the tracks, and the manner in which the patterns are recorded, on the length of magnetic recording tape are shown in FIG. 4. The length of magnetic recording tape is generally identified by 9, it being, however, to be noted that in FIG. 4 both of the audio area and the video area are not illustrated because they do not constitute subject matter of the present invention.

The tracks 8 recorded on the length of tape 9 extend parallel to each other and also extend diagonally relative to the lengthwise direction of the tape 9. The arrow 10 represents a direction of trace by the head during recording or reproduction of information. Reference numeral 12 represents a minimum editing unit comprised of five consecutive tracks. After-recording in which new information is recorded in continued fashion with once-recorded pattern or insert-recording in which a portion of the once-recorded pattern is over-recorded with new information is carried out in units of those five tracks and, therefore, each unit is referred to as the minimum editing unit.

The minimum editing unit 12 is composed of the five tracks each having the twelve sync blocks 6. Accordingly, the minimum editing unit 12 includes 60 sync blocks 6 in total.

This minimum editing unit 12 also includes five sync blocks 6 containing the same contents of the information data. Accordingly, the available number of types of the contents of the information data 4 is 12 and, hence, the minimum editing unit 12 contains information of 480 bits in length. In practice, the 12 types of information data are specified by a different information identification number 41. In other words, of 256 types of information identification numbers, 12 types of information identification numbers are selected and recorded. The information data having the same information identification number has the same information main data.

Figure 5:
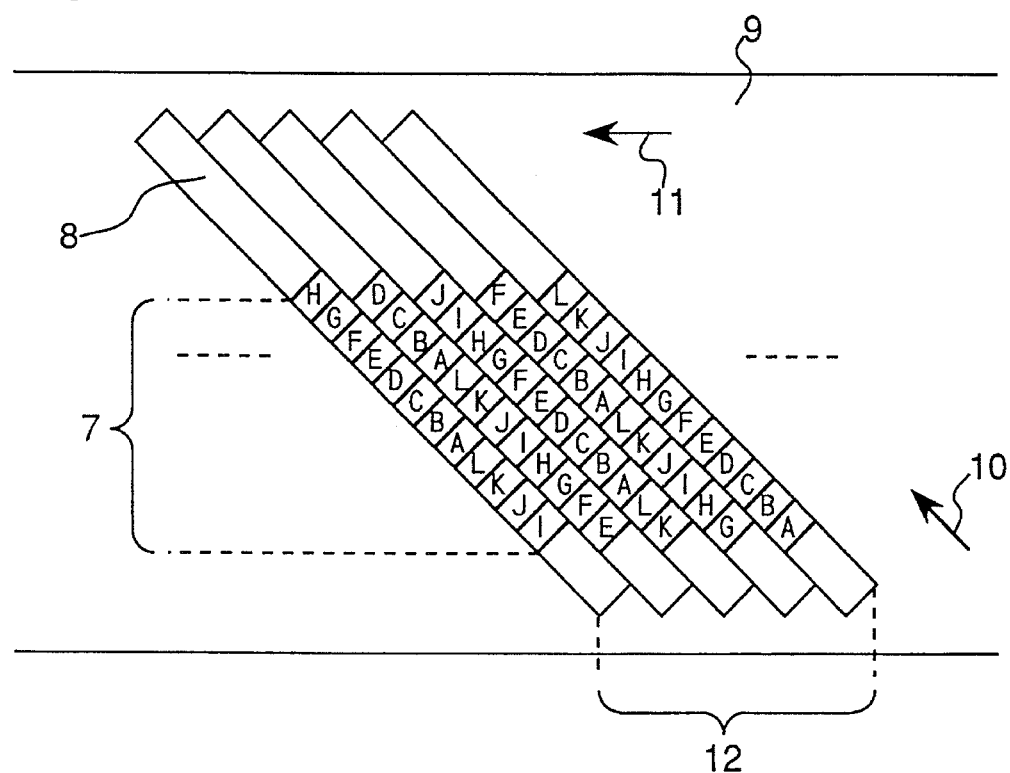
FIG. 5 is a diagram showing a tape pattern illustrative of a sync block positioning method in the embodiment of the present invention.

FIG. 5 illustrates one example of the method in which the sync blocks 6 having the same contents of the information data are arranged. Alphabets A to L shown therein represents respective sync blocks having 12 types of information data.

In each minimum editing unit 12, the sync blocks which contain the same contents of the information data are positioned on the different tracks which include at least one track excluding two tracks which form parts of the minimum editing unit, but occupy respective outermost positions of the minimum editing unit with respect to the lengthwise direction of the tape, and, in each minimum editing unit 12, the sync blocks which are situated on the different tracks and which contain the same contents of the information data are recorded at respective positions on the associated tracks.

Figure 6A:
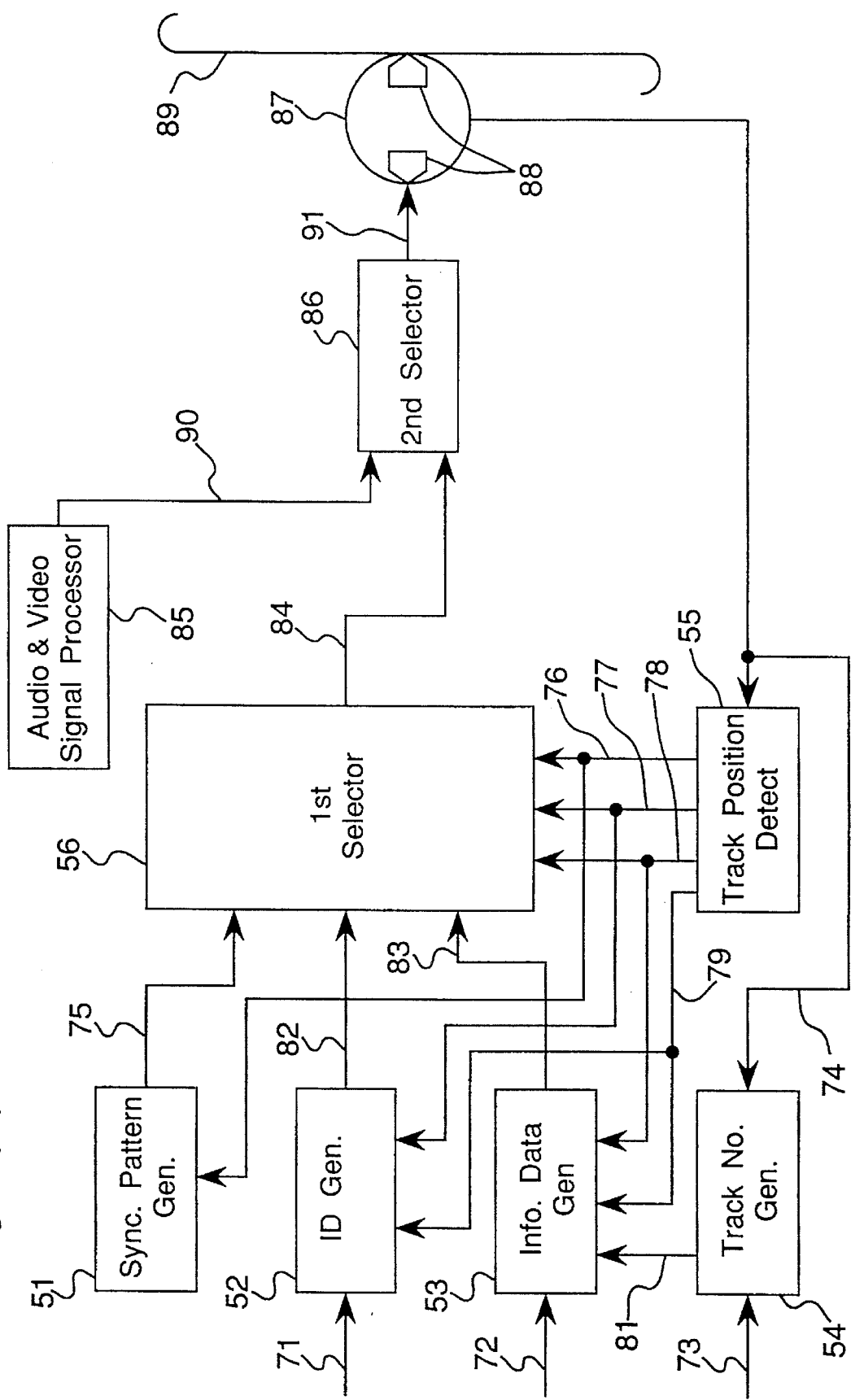
FIG. 6(a) is a block circuit diagram showing a circuit used in the embodiment of the present invention.

An example of an electric circuit employed to accomplish the above described recording pattern is shown in FIG. 6(a). Timing charts of the circuit shown in FIG. 6(a) are shown in FIGS. 7(a)–7(m).

Referring now to FIG. 6(a), the circuit shown therein comprises a track position detecting circuit 55 which is operable upon receipt of a head position information 74 indicative of the position of the head relative to the length of magnetic recording tape to formulate a timing at which a signal is generated within the track. The head position information 74 is a toggle signal which assumes one of two different states "0" and "1" when the head comes to scan the starting point of the track. The track position detecting circuit 55 outputs a sync pattern trigger signal 76 indicative of the timing at which a sync patter is generated, an ID trigger signal 77 indicative of the timing at which both of an ID and an ID parity are generated, and an information data trigger signal 78 indicative of the timing at which both of the information data and an information data parity are generated. The signals 76, 77 and 78 referred to above concurrently serve as respective control signals necessary to cause a first selector circuit 56 to select one of a sync pattern 75 outputted from a sync pattern generator circuit 51, an ID and an ID parity 82 outputted from an ID generator circuit 52, and an information data and an information data parity 83 outputted from an information data generator circuit 53 and then to output the sync block. Reference numeral 79 used in FIG. 6(a) represents a block number indicative of the sequence of the sync blocks within the track.

The head position information 74 is also supplied to a track number generator circuit 54 which, in response to receipt of the head position information 74, counts the number of tracks scanned by the head and generates a track number 81 by resetting according to a track number reset signal 73 supplied thereto. In the illustrated embodiment, a cycle of five track numbers from "0" to "4" is repeated.

The sync pattern generator circuit 51 referred to above outputs the sync pattern 75 in response to the sync pattern trigger signal 76 applied thereto from the track position detecting circuit 55. The ID generator circuit 52 referred to above is operable in response to the ID trigger signal 77 to output the ID and ID parity 82 based on an ID information 71 and the block number 79 fed from the track position detecting circuit 55. The information data generator circuit 53 is operable in response to the information data trigger signal 78 to output one of the twelve types of information data A to L and the information data parity 83 by making reference to the twelve types of information data (i.e., A to L) 72, the track number 81 and the block number 79. In the illustrated embodiment, the following information data shown in Table 1 are outputted according to the track number and the block number.

TABLE 1

| Track | Block Number | | | | | | | | | | | |
|---|---|---|---|---|---|---|---|---|---|---|---|---|
| No. | 0 | 1 | 2 | 3 | 4 | 5 | 6 | 7 | 8 | 9 | 10 | 11 |
| 0 | A | B | C | D | E | F | G | H | I | J | K | L |
| 1 | G | H | I | J | k | L | A | B | C | D | E | F |
| 2 | K | L | A | B | C | D | E | F | G | H | I | J |
| 3 | E | F | G | H | I | J | K | L | A | B | C | D |
| 4 | I | J | K | L | A | B | C | D | E | F | G | H |

The first selector circuit 56 makes use of the sync pattern trigger signal 76, the ID trigger signal 77 and the information data trigger signal 78, all fed from the track position detecting circuit 55, to formulate a sync pattern by switching one of the input signals 75, 82 and 83 and then outputs a sub-code signal 84 to the second selector circuit 86. The second selector circuit 86 is operable to select one of the sub-code signal area signal 84 and a signal representative of an audio signal area and a video signal area.

Reference numeral 87 represents a rotary cylinder rotatably mounted on a drum and carrying two recording and/or reproducing heads 88 circumferentially spaced 180° from each other. The recording and/or reproducing heads 88 are utilized to record a record signal 91, i.e., a signal to be recorded, on the length of magnetic recording tape 89 in any known manner.

Figure 6B:
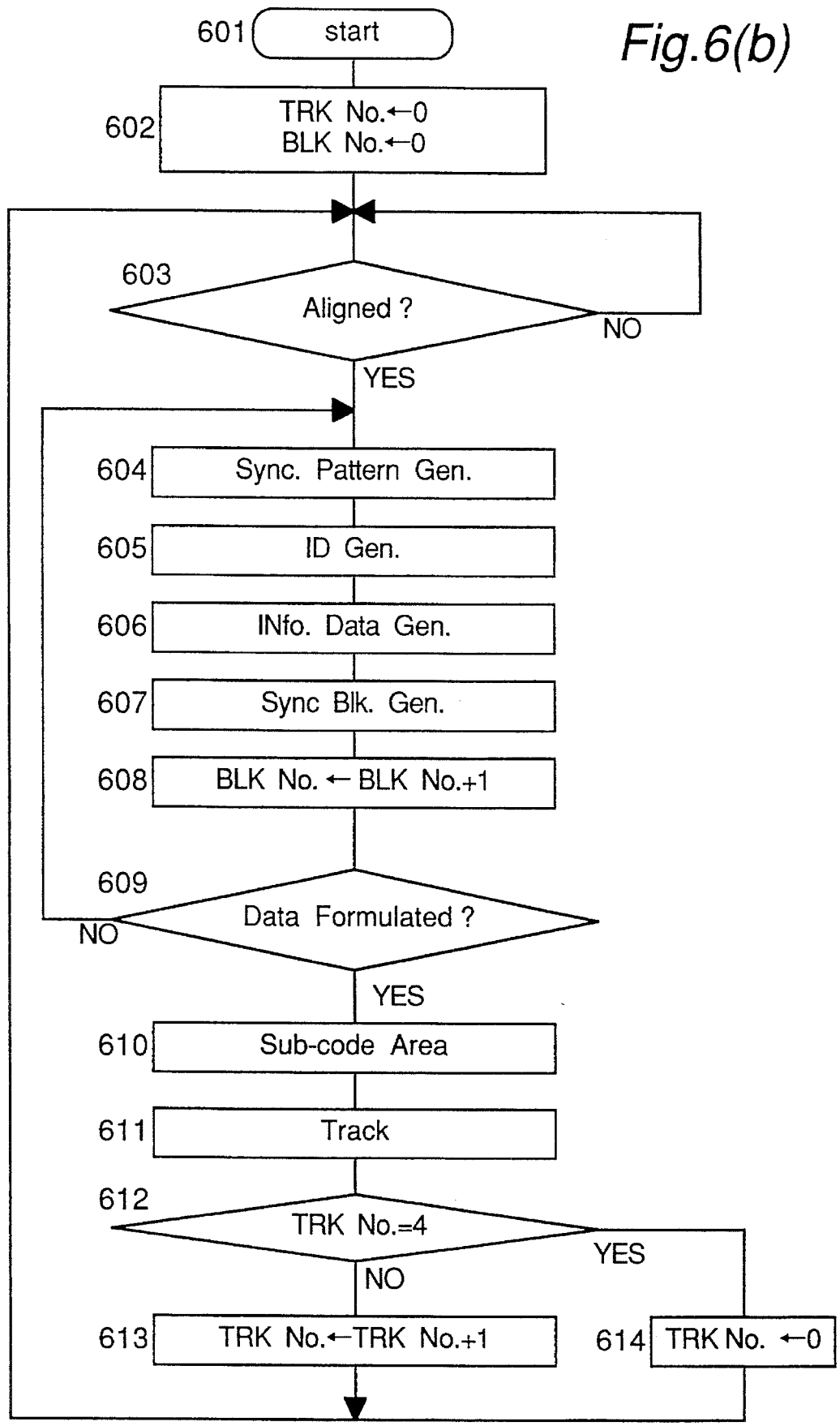
FIG. 6(b) is a flowchart showing the sequence of operation in the embodiment of the present invention.

The circuit shown in FIG. 6(a) operates in a manner as shown in a flowchart in FIG. 6(b). Referring now to FIG. 6(b), subsequent to the start at step 601, the track number (TRK No.) indicative of the cycle of the tracks 8 and the block number (BLK No.) indicative of the sequence of the sync blocks within each track 8 are both initialized to zero at step 602. Then, at step 603, a wait is made if no detection is possible if the recording head is aligned with the leading end of the track, but the next succeeding step 604 takes place if the alignment of the recording head with the leading end of the track is detected. At step 604, the sync pattern is formulated, followed by step 605 at which the ID 2 and the ID parity 3 are formulated. Subsequent to step 605, the information data 4 and the information data parity 5 are formulated at step 606.

The formulation of the information data at step 606 results in a generation of a single information data according to the track number (TRK No.) and the block number (BLK No.) as shown in Table 1. At step 607, a sync block 6 comprised of the sync pattern 1, the ID 2 and the ID parity 3 and the information data prepared respectively at steps 604, 605 and 606 is formulated. Thereafter, at step 608, the block number (BLK No.) is incremented by 1. Then, step 604 is again resumed if formulation of the sync block data for one track has not yet been completed at step 609, but step 610 takes place if the sync block 6 has been formulated and the sync block data for one track has completed at step 609. At step 610, by connecting the plural sync blocks formulated at step 607 together, a sub-code area 7 is formulated. At subsequent step 611, the track 8 including the sub-code area 7 is formulated and is then recorded on the length of magnetic recording tape.

If at step 612 the track number (TRK No.) is found to be 4, the track number is initialized to zero at step 614. On the other hand, if at step 612 the track number is found not to be 4, the track-number is incremented by 1 at step 613. Based on this track number, the minimum editing unit 7 composed of the five tracks 8 can be indicated. After the track number processing described above, the flow returns to step 603 to make a wait until the recording and/or reproducing head is brought in alignment with the leading end of the track.

Figure 8:
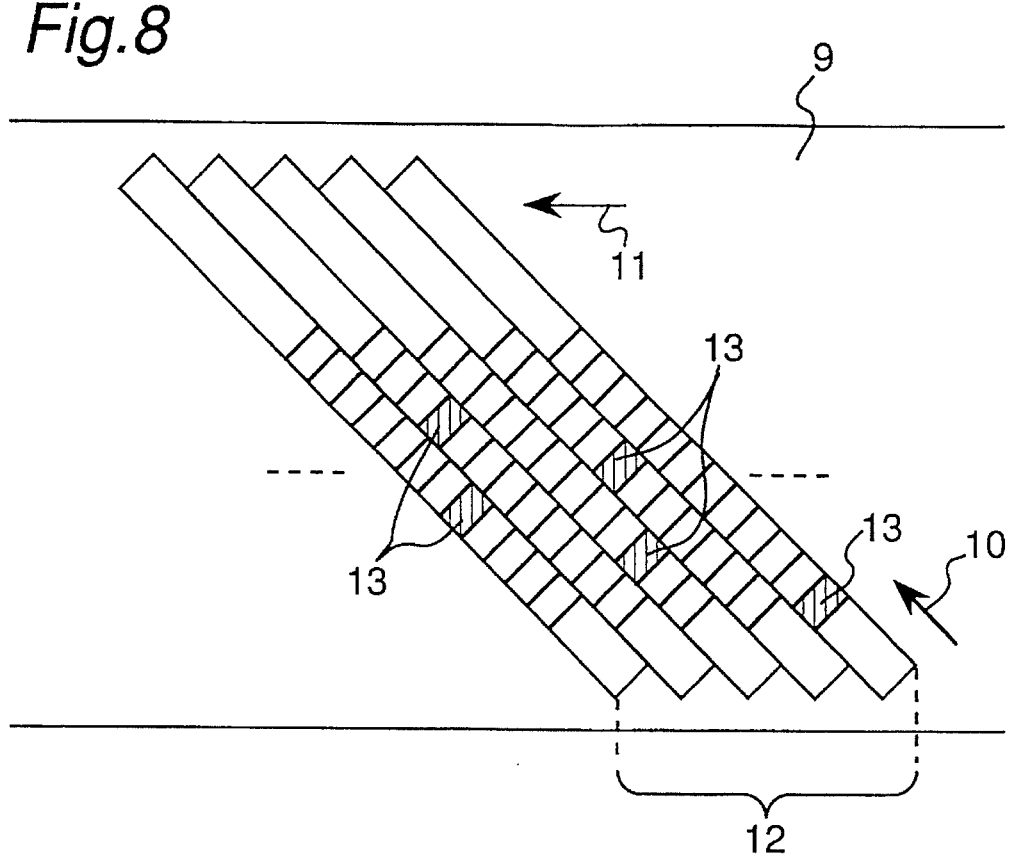
FIG. 8 is a diagram showing a tape pattern illustrative of a sync block positioning method in the embodiment of the present invention.

A pattern of only the sync blocks A having the same information data is shown in FIG. 8. Reference numeral 13 represent the sync blocks A having the same information data. As shown therein, one sync block 13 having the same information data is arranged in each track and, among the tracks, the sync blocks 13 having the same information data of the sync block are arranged at different sync block positions.

The above described data recording method brings about the following merits with respect to an error in reproducing data.

Figure 9:
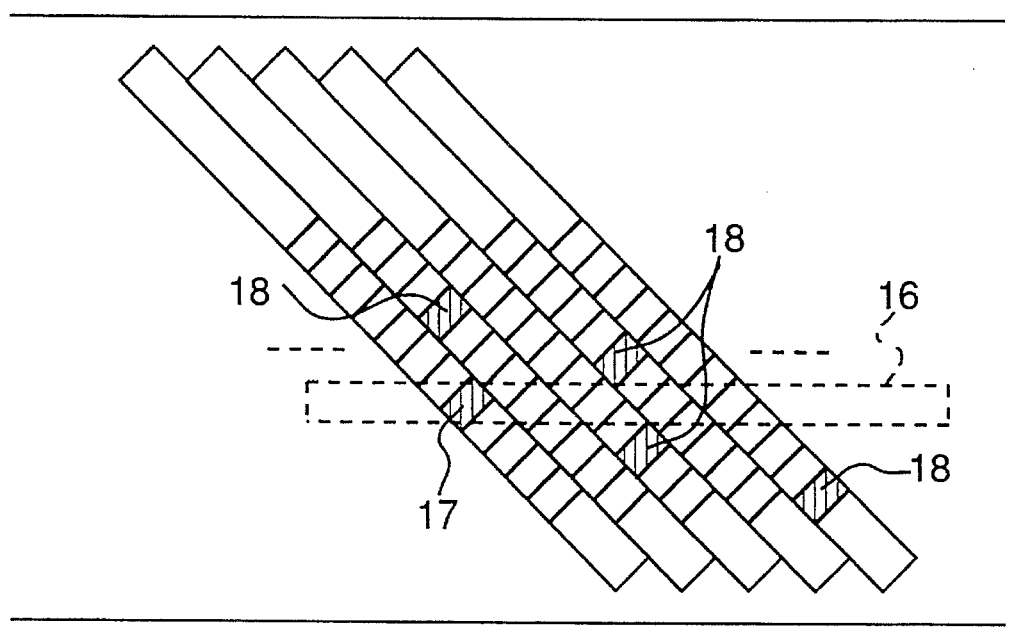
FIG. 9 is a diagram showing a tape pattern in the case where there exists a burst error in a direction parallel to the direction of travel of the tape.

The magnetic tape damaged in a direction parallel to the direction of travel of the tape is partially shown in FIG. 9. Reference numeral 16 used in FIG. 9 represents a damage formed on the magnetic tape, and it is assumed that the sync block present therein cannot be demodulated normally. Considering the sync blocks having the same information data shown in FIG. 5, one, indicated by 17, of the sync blocks A having the same information data cannot be demodulated, but the four sync blocks indicated by 18 can be modulated normally.

Figure 10:
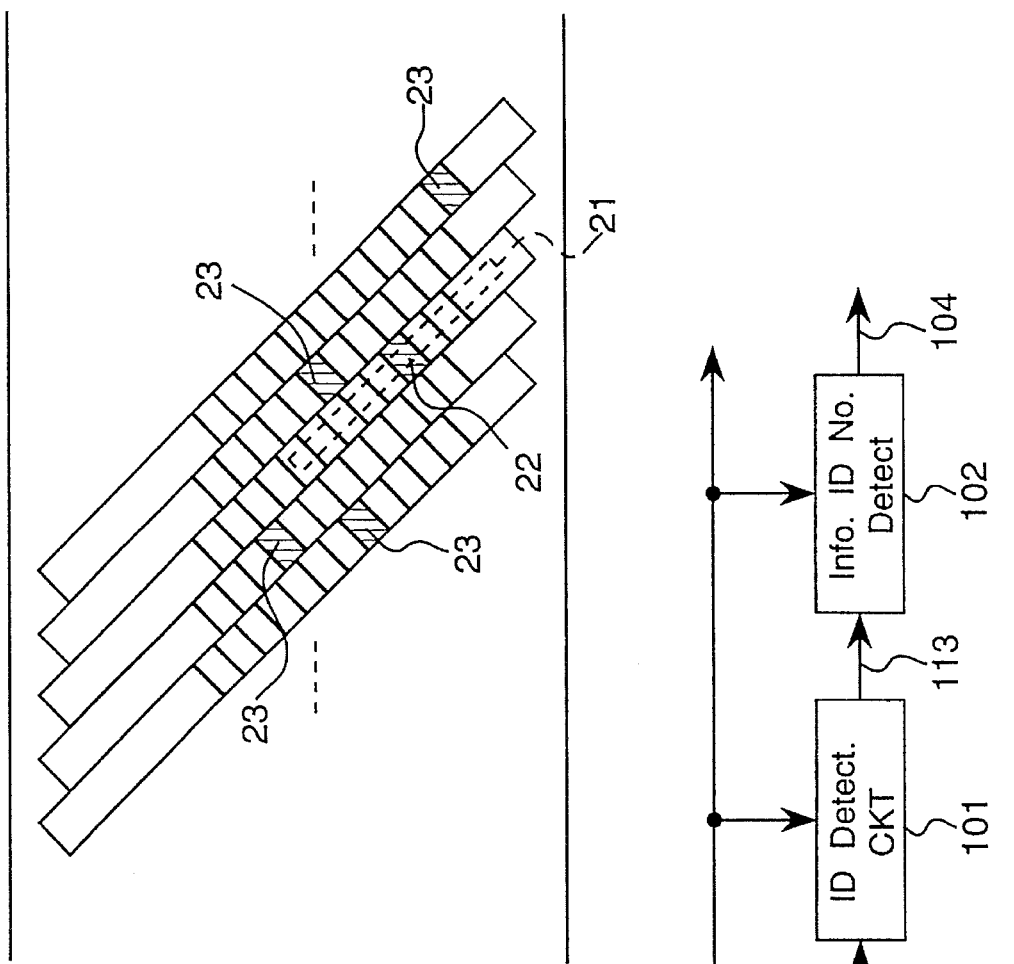
FIG. 10 is a diagram showing a tape pattern in the case where there exists a burst error in a direction parallel to the direction of scan by a head.

The case in which a drop out of a reproduced data occurs continuously in a direction parallel to the direction of track as a result of formation of a gap between the tape and the recording and/or reproducing head in the presence of, for example, projections on the tape is illustrated in FIG. 10. Reference numeral 21 in FIG. 10 represents the position of an error having occurred in a direction lengthwise of the track on the tape, and it is assumed that the sync blocks present therein cannot be demodulated. Considering the sync blocks having the same information data shown in FIG. 5, one, indicated by 22, of the sync blocks A having the same information data cannot be demodulated, but the four sync blocks indicated by 23 can be demodulated.

Figure 11:
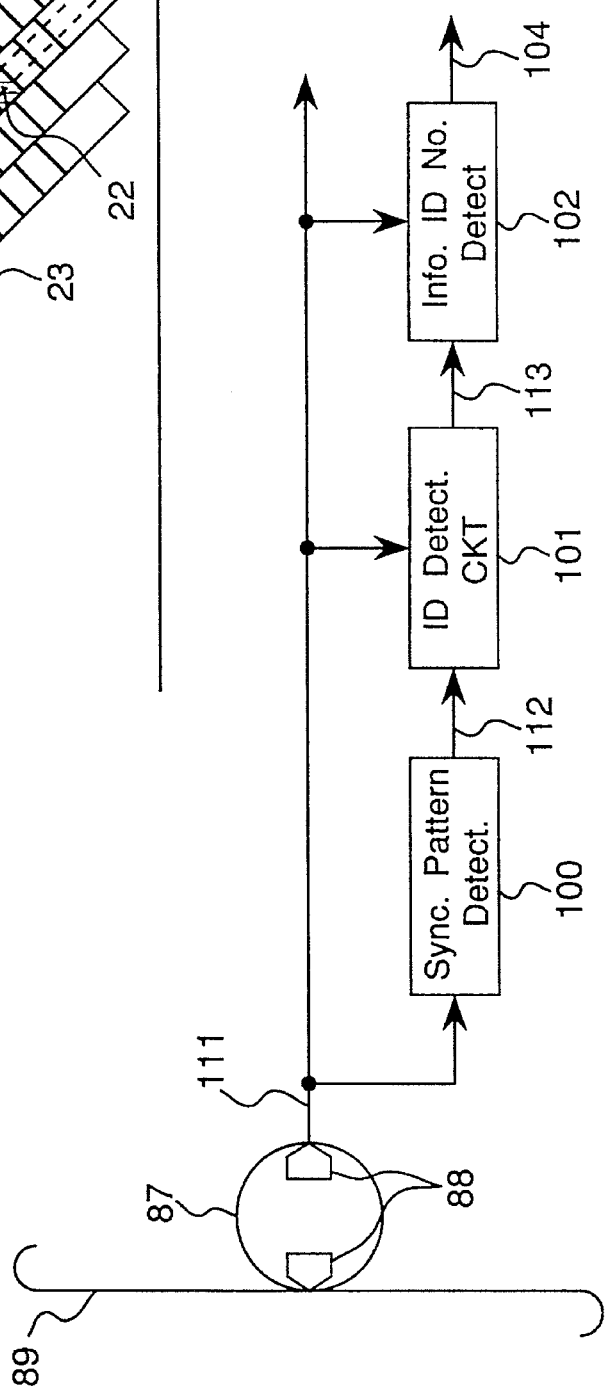
FIG. 11 is a block circuit diagram showing a reproduction detecting circuit in the embodiment of the present invention.

One example of a digital data reproducing apparatus is shown in FIG. 11. The apparatus shown therein includes a sync pattern detecting circuit 100 for detecting the sync pattern from a reproduced data 111 reproduced by the recording and/or reproducing head 88 and for outputting a detected sync pattern signal 112, and an ID detecting circuit 101 for detecting an ID and an ID parity contained in the reproduced data 111 represented by the detected sync pattern signal 112 and for outputting a detected ID signal 113 indicative of whether or not a correct ID has been detected.

Figure 12:
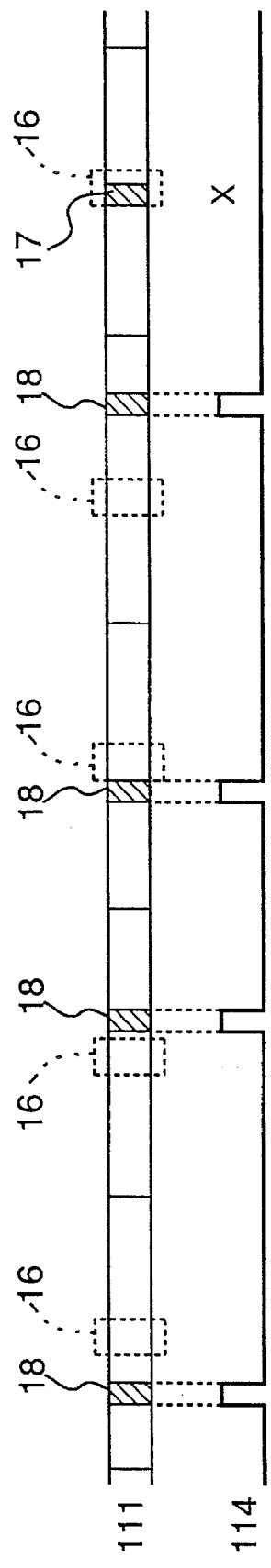
FIG. 12 is a timing chart showing the operation of the reproduction detecting circuit in the embodiment of the present invention.
Figure 13:
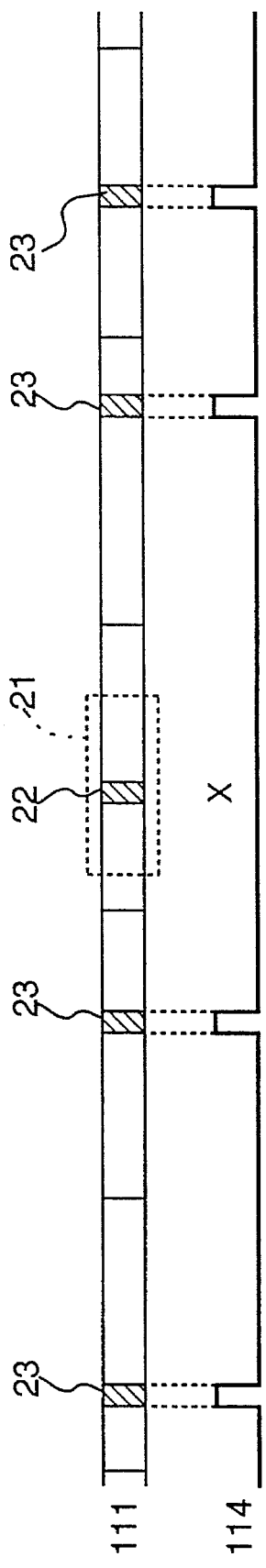
FIG. 13 is a timing chart showing the operation of the reproduction detecting circuit in the embodiment of the present invention.

This apparatus also comprises an information identification number detecting circuit 102 for detecting an information identification number contained in the information data represented by the detected ID signal 113. The timing of reproducing operation in the case of FIG. 9 and the timing of reproducing operation in the case of FIG. 10 are shown in FIGS. 12 and 13, respectively. It is to be noted that, for the sake of brevity, an output 114 from the information identification number detecting circuit 102 is assumed to output a pulse only in the sync blocks A.

The sync blocks having the same information data of the same contents are multiplexed. Therefore, in the case of FIG. 12, one, shown by 17, of the sync blocks A having the same information data cannot be demodulated, but the four sync blocks shown by 18 can be demodulated normally. Also, in the case of FIG. 13, one, shown by 22, of the sync blocks A having the same information data cannot be demodulated, but the four sync blocks shown by 23 can be demodulated normally.

The case in which recording or reproduction is carried out by the use of a recording and/or reproducing head of a width greater than the track pitch will now be discussed. If recording is made over the pattern once recorded, the track width will be discontinuous at an editing point with the head consequently failing to trace the track properly and, therefore, the track in the vicinity of the editing point cannot be reproduced properly.

Figure 14:
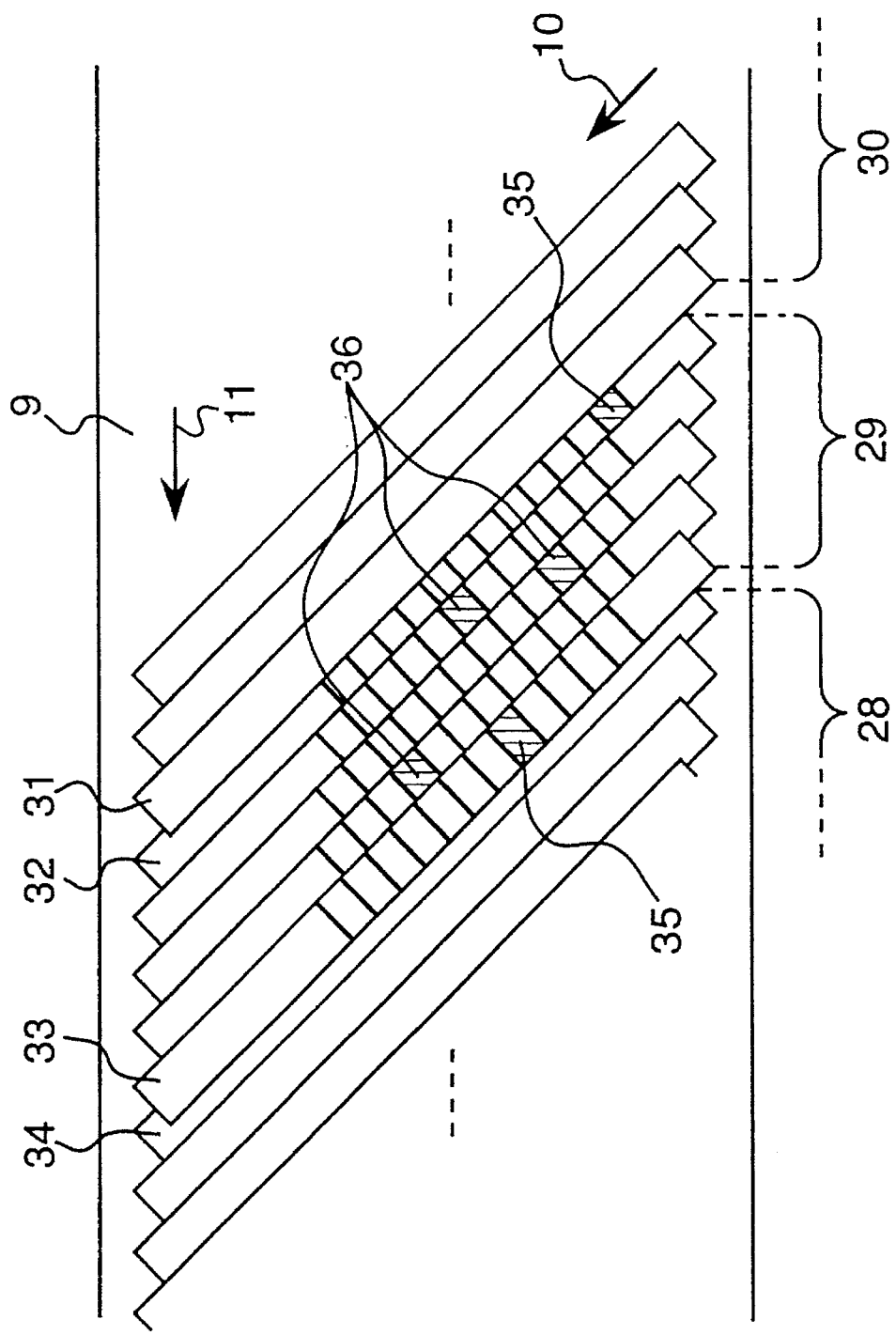
FIG. 14 is a diagram showing a tape pattern in the case where editing and recording are carried out by a head of an increased width.

An example compiled in units of the minimum editing unit is shown in FIG. 14. The case in which, as shown in FIG. 14, the minimum editing unit 29 is recorded over the once-recorded pattern and the minimum editing unit 30 is again recorded will now be discussed. It is to be noted that the minimum editing unit 28 is the one initially recorded.

The width of each of the tracks 31 and 33 is increased to a value larger than the usual width while the width of each of the tracks 32 and 34 is reduced to a value smaller than the usual width. With respect to the minimum editing unit 29, the tracks 32 and 33 cannot be satisfactorily reproduced by the above discussed reason.

Considering the sync blocks A having the same information data as shown in FIG. 5, of them the two sync blocks indicated by 35 cannot be demodulated properly, but the three sync blocks indicated by 36 can be properly modulated.

Also, with a digital data recording method of the present invention, by moving the length of magnetic recording tape at a speed different from a normal speed, even though the head fail to properly trace according to the pattern of the tracks, the possibility of the contents of all of the information data being demodulated increases. In other words, since the sync blocks having the same information data are substantially uniformly distributed within the minimum editing unit, even during a high speed reproduction in which the head fails to trace according to the pattern of the tracks and the head traces only a single signal area within the minimum editing unit, there is an increased possibility that all of the contents of the information data can be demodulated.

Examples of different recording patterns are shown in FIGS. 15, 16, 17 and 18, respectively.

Figure 15:
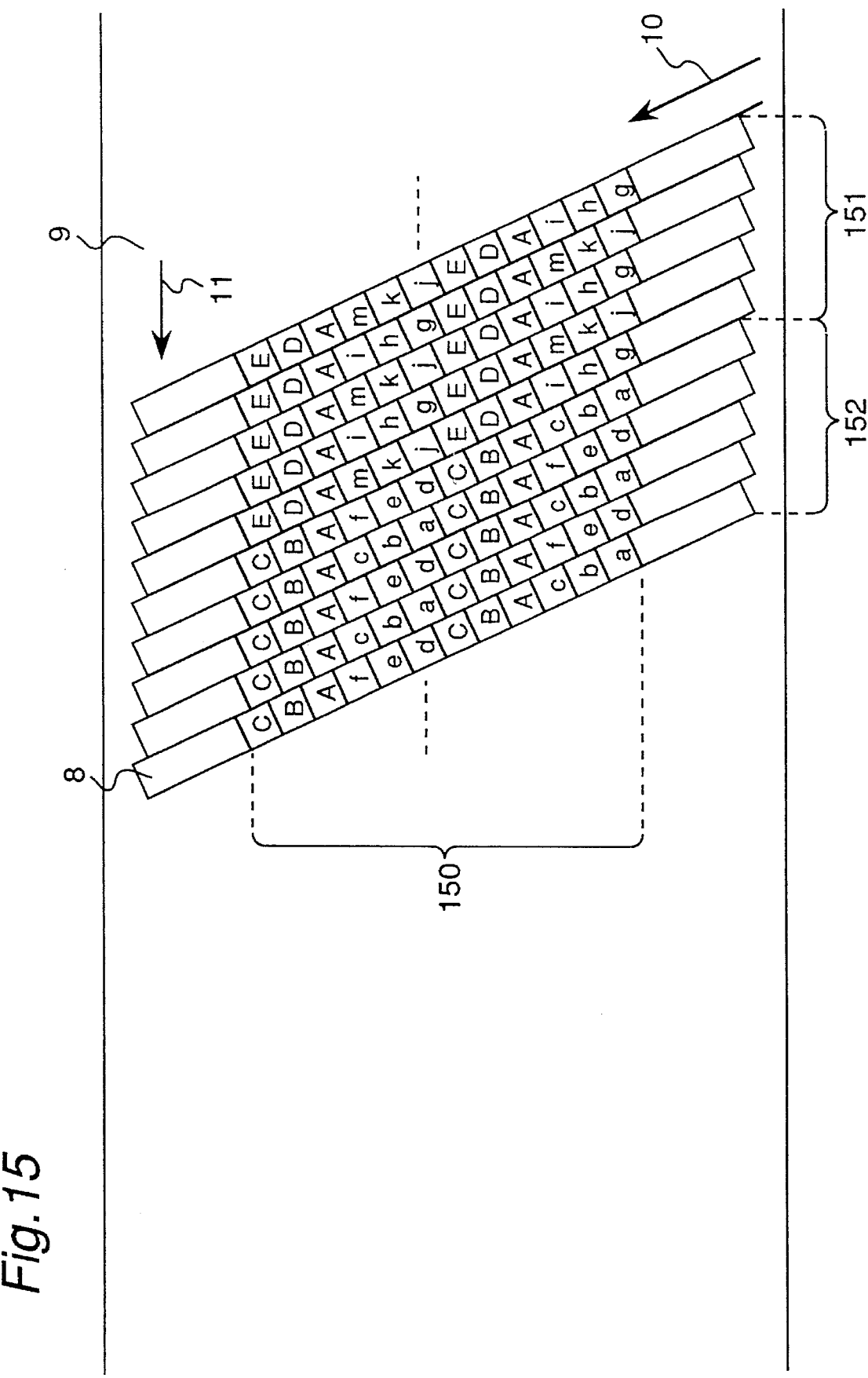
FIG. 15 is an explanatory diagram showing a tape pattern in the embodiment of the present invention.

The sub-code area 150 in each of the recorded track shown in FIG. 15 is composed of the twelve sync blocks 6 and the minimum editing unit is composed of the five tracks. As shown in FIG. 15, the minimum editing unit 151 is composed of the sync blocks having nine types of information data. A, D, E, g to k and m. On the other hand, the minimum editing unit 152 is composed of the sync blocks having nine types of information data A, B, C, a to f.

Figure 16:
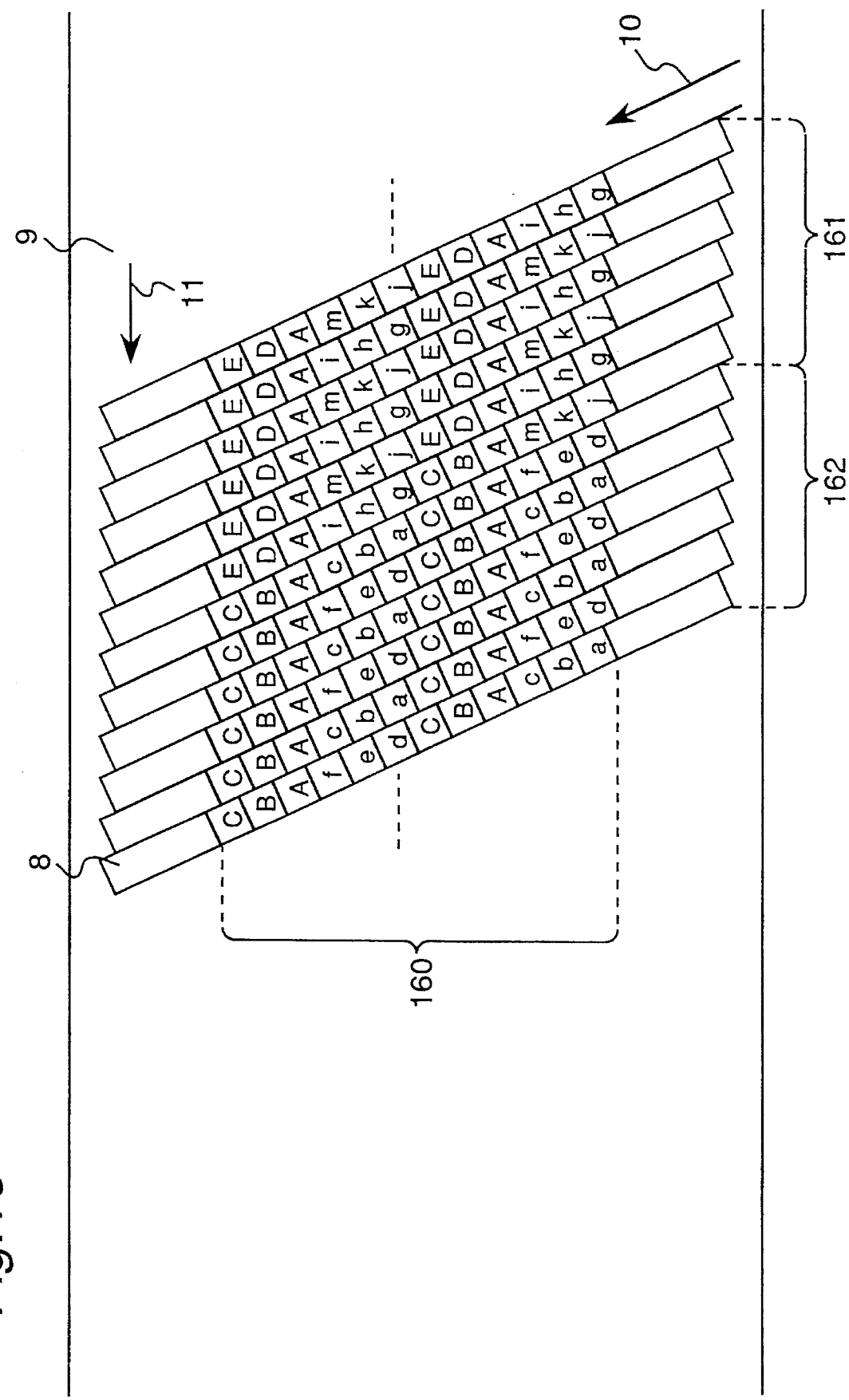
FIG. 16 is an explanatory diagram showing a tape pattern in the embodiment of the present invention.

The sub-code area 160 in each of the recorded track shown in FIG. 16 is composed of the twelve sync blocks 6 and the minimum editing unit is composed of the six tracks. As shown in FIG. 16, the minimum editing unit 161 is composed of the sync blocks having nine types of information data A, D, E, g to k. On the other hand, the minimum editing unit 162 is composed of the sync blocks having nine types of information data A, B, C, a to f.

Figure 17:
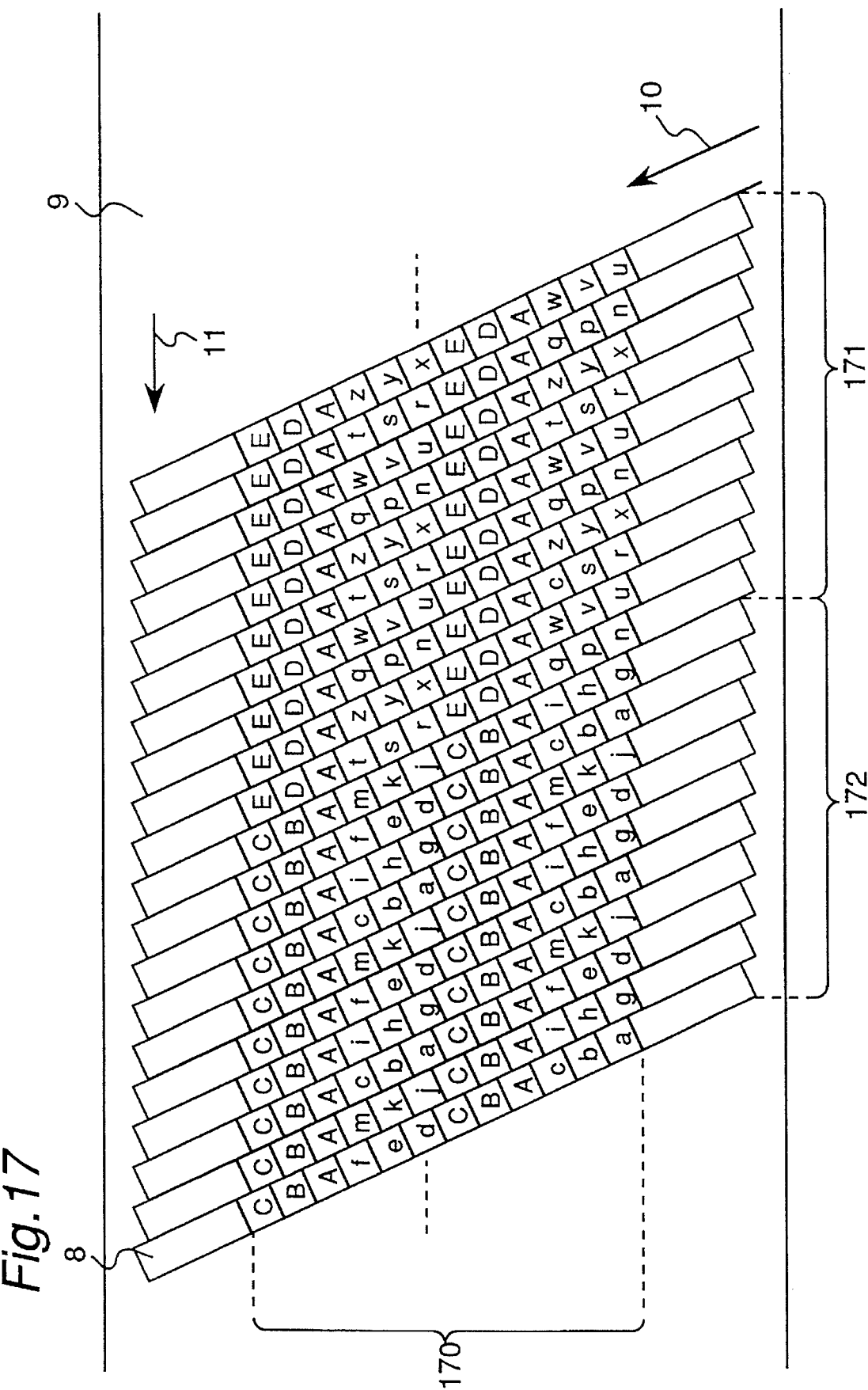
FIG. 17 is an explanatory diagram showing a tape pattern in the embodiment of the present invention.

The sub-code area 170 in each of the recorded track shown in FIG. 17 is composed of the twelve sync blocks 6 and the minimum editing unit is composed of the ten tracks. As shown in FIG. 17, the minimum editing unit 171 is composed of the sync blocks having twelve types of information data A, D, E, n, p to z. On the other hand, the minimum editing unit 172 is composed of the sync blocks having twelve types of information data A, B, C, a to k, m.

Figure 18:
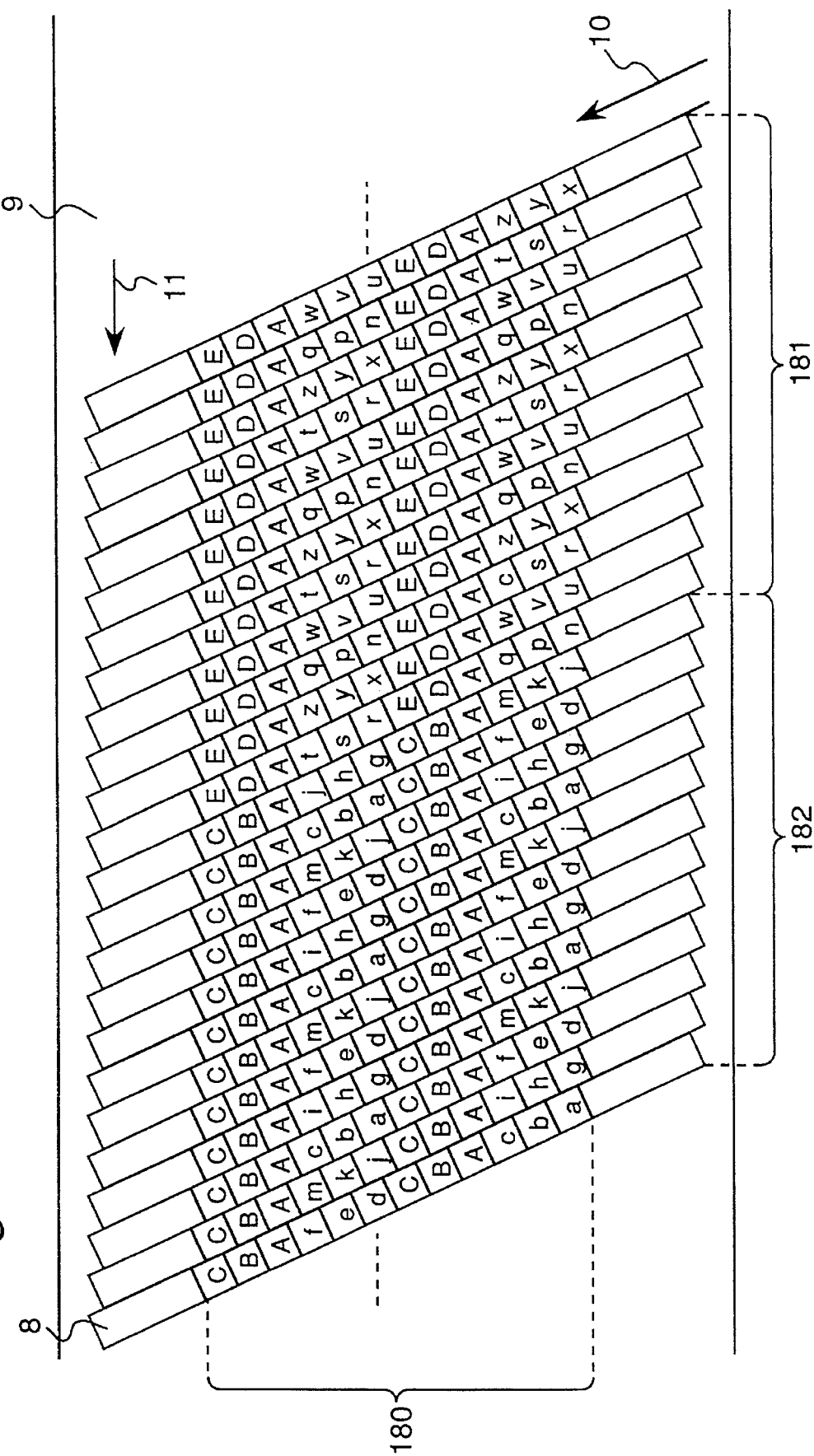
FIG. 18 is an explanatory diagram showing a tape pattern in the embodiment of the present invention.

The sub-code area 180 in each of the recorded track shown in FIG. 18 is composed of the twelve sync blocks 6 and the minimum editing unit is composed of the twelve tracks. As shown in FIG. 18, the minimum editing unit 181 is composed of the sync blocks having twelve types of information data A, D, E, n, p to z. On the other hand, the minimum editing unit 182 is composed of the sync blocks having twelve types of information data A, B, C, a to k, m.

Each of the above discussed recording patterns shown respectively in FIGS. 15 to 18 can be implemented by the use of a circuit configuration substantially similar to that shown in and described with reference to FIG. 6(*a*).

With the foregoing digital data recording apparatus, since each track includes the sub-code area in addition to the audio area and the video area, no linear track for the sub-code is needed and recording or reproduction of the sub-code area is also possible.

Also, since the five sync blocks having the same information data are uniformly distributed within the minimum editing unit composed of the five tracks, all of the information data can be properly demodulated even though the tape is damaged in the direction parallel to the direction of travel of the length of tape and/or the reproduced data are dropped out continuously in the direction parallel to each track as a result of the formation of the gap between the length of tape and the head in the presence of projections on the length of tape.

Again, in the recording and/or reproducing apparatus in which the head of a width larger than the track pitch is employed, all of the information data can be properly demodulated even though the track in the vicinity of the editing point at which the once-recorded pattern is over-recorded fails to be reproduced.

Yet, by moving the length of tape at a speed different from the normal speed, even during the high speed reproduction in which the head fails to trace the track according to the pattern, the performance with which the information data are demodulated can be improved.

Although the present invention has been described in connection with the preferred embodiments thereof with reference to the accompanying drawings, it is to be noted that various changes and modifications are apparent to those skilled in the art. For example, the number of the tracks forming the minimum editing unit, the number of the sync block forming the signal area (sub-code area) or the number of the sync blocks having the same information data within each minimum editing unit is not limited to that referred to above.

The smaller the length of each sync block, the more is the tape transport speed increased during the high speed reproduction. Therefore, the amount of information data which cannot be demodulated by reason of a burst error having an infinite length can be reduced. Accordingly, for a given amount of information such as in the present invention, a fine division of the signal data area with the sync block is feasible. In other words, the present invention can bring about effects if the amount of the information data forming the sync block is reduced while the number of the sync blocks is increased.

Because of the foregoing, the parity length of the information data forming the sync blocks is preferably adjusted to a minimum necessary length with which an error can be detected or corrected such as in the present invention.

Although the method of arranging the sync blocks may not be always limited to that disclosed in connection with the illustrated embodiment of the present invention, it suffices that the sync blocks having the same contents of the information data are distributed to the plural tracks which include at least one track other than at least the tracks on both sides of the minimum editing unit while the sync blocks having the same contents of the information data existing at the different tracks within the single minimum editing unit are recorded so as to be positioned at plural positions with respect to the direction of each track.

Although as a method of arranging the sync blocks within the single minimum editing unit the sync blocks having the same contents of the information data are distributed to the plural track, a method in which the sync blocks having the same contents of the information data are distributed without being concentrated on a specific one of the tracks, but to the plural positions with respect to the direction of each track and in which arrangement is made without being concentrated at a specific one of the plural positions is effective to bring about favorable results in the previously described burst error and also in the high speed reproduction.

Also, considering the edition to be made, it is preferred that the sync blocks having the same contents of the information data are not concentrated at the tracks on the opposite sides of the minimum editing unit.

In the case of important data, it is effective if such data are included in the contents of the information data in all of the sync block forming the minimum editing unit.

Yet, similar effects can be obtained if recording is made in such a way that the single minimum editing unit includes a number of the sync blocks having the same contents of the information and the sync blocks having the same contents of the information data are distributed to the plural tracks which include at least one track other than the tracks on the opposite sides of at least the minimum editing unit.

In addition, similar effects can be obtained even if recording is made in such a way that the single minimum editing unit includes a number of the sync blocks having the same contents of the information and the sync blocks having the same contents of the information data are distributed to the plural positions as the respective position in a direction parallel to the direction of each track.

Although in the foregoing illustrated embodiment the recorded pattern has been described as formed by the use of the circuit shown in FIG. 6(a), it is to be noted that any circuit may be employed if it is effective to formulate the same pattern as that of the recorded pattern. Also, although in the illustrated embodiment the recorded pattern has been described as formed by the use of the circuit shown in FIG. 6(a), a portion of the circuit or the whole of the circuit may be implemented by means of a programmable microcomputer software.

Such changes and modifications are to be understood as included within the scope of the present invention as defined by the appended claims, unless they depart therefrom.

What is claimed is:

1. A digital data recording method for recording digital input data on juxtaposed tracks of a recording medium, said method comprising:

an information data formulating step of formulating information data comprising an identification number indicative of the contents of the information data and a main information data, which is a predetermined quantity converted from the input data, and an information data parity for use in detecting or correcting an error in the information data;

an ID formulating step of formulating an ID composed of information including position information indicative of a position of the information data relative to the recording medium and an ID parity for use in detecting or correcting an error in the ID;

a sync pattern formulating step of formulating a sync pattern;

a sync block formulating step of formulating a sync block comprised of the sync pattern, the ID, the ID parity, the information data and the information data parity;

a sync block positioning step of formulating a sub-code recording area composed of a plurality of sync blocks connected together; and a track formulating step for formulating the tracks each having at least the sub-code recording area and an information recording area;

wherein said sync block positioning step forms a plurality of minimum editing units with which recording or reproduction is carried out on or from the recording medium, each of said minimum editing units including a predetermined number of consecutive tracks not smaller than three tracks, said sub-code recording area of each of said consecutive tracks of said minimum editing unit including a plurality of sync blocks formed sequentially therein and having different contents, respectively, said plurality of sync blocks being distributed over the tracks of the minimum editing unit with the sync blocks in one track offset in position relative to the sync blocks in the neighboring track with respect to the direction of travel of the recording medium.

2. A digital data recording method for recording digital input data on juxtaposed tracks of a recording medium, said method comprising:

an information data formulating step of formulating information data comprising an identification number indicative of the contents of the information data and a main information data, which is a predetermined quantity converted from the input data, and an information data parity for use in detecting or correcting an error in the information data;

an ID formulating step of formulating an ID composed of information including position information indicative of a position of the information data relative to the recording medium and an ID parity for use in detecting or correcting an error in the ID;

a sync pattern formulating step of formulating a sync pattern;

a sync block formulating step of formulating a sync block comprised of the sync pattern, the ID, the ID parity, the information data and the information data parity;

a sync block positioning step of formulating a sub-code recording area composed of a plurality of sync blocks connected together; and a track formulating step for formulating the tracks each having at least the sub-code recording area and an information recording area;

wherein said sync block positioning step forms a plurality of minimum editing units with which recording or reproduction is carried out on or from the recording medium, each of said minimum editing units including a predetermined number of consecutive tracks not smaller than three tracks, said sub-code recording area of each of said consecutive tracks of said minimum editing unit including first and second groups of sync blocks formed sequentially therein, the sync blocks of the first group having contents different from those of the sync block of the second group, and wherein in each minimum editing unit said sync blocks having the same contents are distributed to the plural tracks.

3. A digital data recording method according to claim 2, wherein said first group of the sync blocks in each track of the minimum editing unit is divided into first and second sub-groups of the sync blocks, the sync blocks of the first sub-group being identical with the sync blocks of the second sub-group, and said second group of the sync blocks in each track of the minimum editing unit is divided into third and fourth sub-groups of the sync blocks, the sync blocks of the third sub-group being different from the sync blocks of the fourth sub-group, and wherein in each track of the minimum editing unit said first and second sub-groups are positioned so as to alternate with the third and fourth sub-groups, respectively.

4. A digital data recording apparatus for recording digital input data on juxtaposed tracks of a recording medium, said apparatus comprising:

an information data formulating means for formulating information data comprising an identification number indicative of the contents of the information data and a main information data, which is a predetermined quantity converted from the input data and an information data parity for use in detecting or correcting an error in the information data;

an ID formulating means for formulating an ID composed of information including position information indicative of a position of the information data relative to the recording medium and an ID parity for use in detecting or correcting an error in the ID;

a sync pattern formulating means for formulating a sync pattern;

a sync block formulating means for formulating a sync block comprised of the sync pattern, the ID, the ID parity, the information data and the information data parity;

a sync block positioning means for formulating a sub-code recording area composed of a plurality of sync blocks connected together; and a track formulating means for formulating the tracks each having at least the sub-code recording area and an information recording area;

wherein said sync block positioning means forms a plurality of minimum editing units with which recording or reproduction is carried out on or from the recording medium, each of said minimum editing units including a predetermined number of consecutive tracks not smaller than three tracks, said sub-code recording area of each of said consecutive tracks of said minimum editing unit including a plurality of sync blocks formed sequentially therein and having different contents, respectively, said plurality of sync blocks being distributed over the tracks of the minimum editing unit with the sync blocks in one track offset in position relative to the sync blocks in the neighboring track with respect to the direction of travel of the recording medium.

5. A digital data recording method for recording digital input data on juxtaposed tracks of a recording medium, said method comprising:

an information data formulating step of formulating information data comprising an identification number indicative of the contents of the information data and a main information data, which is a predetermined quantity converted from the input data, and an information data parity for use in detecting or correcting an error in the information data;

an ID formulating step of formulating an ID composed of information including position information indicative of a position of the information data relative to the recording medium and an ID parity for use in detecting or correcting an error in the ID;

a sync pattern formulating step of formulating a sync pattern;

a sync block formulating step of formulating a sync block comprised of the sync pattern, the ID, the ID parity, the information data and the information data parity;

a sync block positioning step of formulating a sub-code recording area composed of a plurality of sync blocks connected together; and a track formulating step for formulating the tracks each having at least the sub-code recording area and an information recording area;

wherein said sync block positioning step forms a plurality of minimum editing units with which recording or reproduction is carried out on or from the recording medium, each of said minimum editing units including a predetermined number of consecutive tracks not smaller than three tracks, said sub-code recording area of each of odd-numbered ones of said consecutive tracks of said minimum editing unit including first and second groups of sync blocks formed sequentially therein, and said sub-code recording area of each of even-numbered ones of said consecutive tracks of said minimum editing unit, which alternate with said odd-numbered tracks, including third and fourth groups of sync blocks formed sequentially therein, and wherein in each track of the minimum editing unit of said first and second odd-numbered and even-numbered sub-groups are positioned so as to alternate with the third and fourth sub-groups, respectively.

6. A digital data recording apparatus for recording digital input data on juxtaposed tracks of a recording medium, said apparatus comprising:

an information data formulating means for formulating information data comprising an identification number indicative of the contents of the information data and a main information data, which is a predetermined quantity converted from the input data, and an information data parity for use in detecting or correcting an error in the information data;

an ID formulating means for formulating an ID composed of information including position information indicative of a position of the information data relative to the recording medium and an ID parity for use in detecting or correcting an error in the ID;

a sync pattern formulating means for formulating a sync pattern;

a sync block formulating means for formulating a sync block comprised of the sync pattern, the ID, the ID parity, the information data and the information data parity;

a sync block positioning means for formulating a sub-code recording area composed of a plurality of sync blocks connected together; and a track formulating means for formulating the tracks each having at least the sub-code recording area and an information recording area;

wherein said sync block positioning means forms a plurality of minimum editing units with which recording or reproduction is carried out on or from the recording medium, each of said minimum editing units including a predetermined number of consecutive tracks not smaller than three tracks, said sub-code recording area of each of said consecutive tracks of said minimum editing unit including first and second groups of sync blocks formed sequentially therein, the sync blocks of the first group having contents different from those of the sync block of the second group, and wherein in each minimum editing unit said sync blocks having the same contents are distributed to the plural tracks.

7. A digital data recording apparatus according to claim 6, wherein said first group of the sync blocks in each track of the minimum editing unit is divided into first and second sub-groups of the sync blocks, the sync blocks of the first sub-group being identical with the sync blocks of the second sub-group, and said second group of the sync blocks in each track of the minimum editing unit is divided into third and fourth sub-groups of the sync blocks, the sync blocks of the third sub-group being different from the sync blocks of the fourth sub-group, and wherein in each track of the minimum editing unit said first and second sub-groups are positioned so as to alternate with the third and fourth sub-groups, respectively.

8. A digital data recording apparatus for recording digital input data on juxtaposed tracks of a recording medium, said apparatus comprising:

an information data formulating means for formulating information data comprising an identification number indicative of the contents of the information data and a main information data, which is a predetermined quantity converted from the input data, and an information data parity for use in detecting or correcting an error in the information data;

an ID formulating means for formulating an ID composed of information including position information indicative of a position of the information data relative to the recording medium and an ID parity for use in detecting or correcting an error in the ID;

a sync pattern formulating means for formulating a sync pattern;

a sync block formulating means for formulating a sync block comprised of the sync pattern, the ID, the ID parity, the information data and the information data parity;

a sync block positioning means for formulating a sub-code recording area composed of a plurality of sync blocks connected together; and a track formulating means for formulating the tracks each having at least the sub-code recording area and an information recording area;

wherein said sync block positioning means forms a plurality of minimum editing units with which recording or reproduction is carried out on or from the recording medium, each of said minimum editing units including a predetermined number of consecutive tracks not smaller than three tracks, said sub-code recording area of each of odd-numbered ones of said consecutive tracks of said minimum editing unit including first and second groups of sync blocks formed sequentially therein, and said sub-code recording area of each of even-numbered ones of said consecutive tracks of said minimum editing unit, which alternate with said odd-numbered tracks, including third and fourth groups of sync blocks formed sequentially therein, and wherein in each track of the minimum editing unit of said first and second odd-numbered and even-numbered sub-groups are positioned so as to alternate with the third and fourth sub-groups, respectively.

* * * * *